(12) United States Patent
Mathew et al.

(10) Patent No.: US 11,015,579 B2
(45) Date of Patent: May 25, 2021

(54) TRANSPORTATION SYSTEM AND METHOD FOR LOADING A WIND TURBINE TOWER SEGMENT

(71) Applicant: Vestas Wind Systems A/S, Aarhus N. (DK)

(72) Inventors: Shinto Mathew, Randers Nv (DK); Michael Christensen, Hinnerup (DK); Joris Kofman, Aalborg Øst (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 16/496,650

(22) PCT Filed: Mar. 16, 2018

(86) PCT No.: PCT/DK2018/050047
§ 371 (c)(1),
(2) Date: Sep. 23, 2019

(87) PCT Pub. No.: WO2018/177486
PCT Pub. Date: Oct. 4, 2018

(65) Prior Publication Data
US 2020/0378365 A1    Dec. 3, 2020

(30) Foreign Application Priority Data
Mar. 31, 2017    (DK) ........................ PA 2017 70236

(51) Int. Cl.
*F03D 13/40*    (2016.01)
(52) U.S. Cl.
CPC .......... *F03D 13/40* (2016.05); *F05B 2230/61* (2013.01); *F05B 2260/02* (2013.01)
(58) Field of Classification Search
CPC ... F03D 13/40; F05B 2230/61; F05B 2260/02
(Continued)

(56) References Cited

U.S. PATENT DOCUMENTS

| | | | |
|---|---|---|---|
| 6,896,457 B2 * | 5/2005 | Halliar | ...................... B60P 7/12 410/36 |
| 7,303,365 B2 * | 12/2007 | Wobben | .................. F03D 13/40 410/45 |

(Continued)

FOREIGN PATENT DOCUMENTS

| | | |
|---|---|---|
| CN | 1771151 A | 5/2006 |
| CN | 106536919 A | 3/2017 |

(Continued)

OTHER PUBLICATIONS

China National Intellectual Property Administration, First Notification of Office Action in CN Application No. 201880017984.0, dated Jun. 5, 2020.

(Continued)

*Primary Examiner* — Lynn E Schwenning
(74) *Attorney, Agent, or Firm* — Wood Herron & Evans LLP

(57) ABSTRACT

A transportation system (300) for, and a method (1104, 1106, 1108) of loading for transportation of, a segment (330) of a wind turbine tower are disclosed. The system has a transportation platform (304), the transportation platform having a centreline (320), and a segment support (306, 310) mountable on the transportation platform. The segment support is configured to permit tilting of a supported segment with respect to a pivot point (308) of the support. The segment support is further configured to receive a segment such that the centre of gravity (342) of the segment is offset transversely from: the support pivot point; and from the transport platform centreline. The segment support is also configured to, having received the segment, permit tilting of the segment with respect to the support pivot point to a rest position, and in the rest position the centre of gravity of the (Continued)

segment is alignable vertically with the transport platform centreline.

20 Claims, 13 Drawing Sheets

(58) Field of Classification Search
USPC .............................................. 410/44, 45, 47
See application file for complete search history.

(56) References Cited

U.S. PATENT DOCUMENTS

| | | | |
|---|---|---|---|
| 8,057,140 B2* | 11/2011 | Entwistle | B64F 5/50 |
| | | | 410/47 |
| 2008/0003088 A1* | 1/2008 | Banta | F03D 13/40 |
| | | | 414/460 |
| 2008/0245029 A1* | 10/2008 | Maj | F03D 13/10 |
| | | | 52/749.1 |
| 2012/0107065 A1* | 5/2012 | Peterson | B60P 7/12 |
| | | | 410/47 |
| 2015/0192104 A1 | 7/2015 | Lulker et al. | |
| 2015/0308134 A1* | 10/2015 | Bjoernskov | F03D 80/00 |
| | | | 52/741.3 |
| 2015/0337799 A1 | 11/2015 | Hansen et al. | |
| 2017/0030101 A1 | 2/2017 | Pedersen | |

FOREIGN PATENT DOCUMENTS

| | | |
|---|---|---|
| EP | 2698530 A2 | 2/2014 |
| EP | 2416986 B1 | 11/2014 |
| EP | 2808540 A1 | 12/2014 |
| FR | 3006958 A1 | 12/2014 |
| WO | 2015158351 A1 | 10/2015 |
| WO | 2015188836 A1 | 12/2015 |
| WO | 2016055071 A1 | 4/2016 |

OTHER PUBLICATIONS

European Patent Office, International Search Report and Written Opinion in PCT Application No. PCT/DK2018/050047, dated May 30, 2018.

Danish Patent and Trademark Office, Search and Examination Report in PA2017 70236, dated Sep. 14, 2017.

* cited by examiner

TRANSPORTATION SYSTEM AND METHOD FOR LOADING A WIND TURBINE TOWER SEGMENT

FIELD OF THE INVENTION

This invention is directed to transportation systems for segments of a wind turbine tower, and methods of loading for transportation of such tower segments.

BACKGROUND OF THE INVENTION

Wind turbines for power generation are well known in the art. In a common arrangement, a nacelle is mounted on a tower, with a rotor and blades being mounted on the nacelle. The rotor is mounted on a rotor shaft which is supported in the nacelle by a shaft housing.

With successive generations of wind turbines, the overall sizes of the turbines have increased greatly. Because of this, wind turbine towers constructed from sections have been considered. For the largest turbines, a previously considered system provides a series of curved segments combinable with other like segments to form a section of a wind turbine tower, and in turn those cylindrical sections are mountable adjacent to other like sections to form a completed wind turbine tower.

Transportation of these segments and sections can be difficult, essentially because of the large size and weight of these components. If transported by vehicle, such as on the road by a truck and trailer arrangement, the trailer has to be very long to accommodate the segment or section. Typically these systems load the segment onto the trailer so that the segment lies horizontally, with the arc spanning the transverse width of the trailer, with its considerable weight therefore balanced across the width of the trailer. However, the sheer size of the segment can sometimes be even too large for such trailers, particularly as the width of the arc of the segment can be too great to fit onto normal roads.

For this reason, a previously considered system has provided a loading arrangement in which the segment can be loaded or arranged onto the trailer so that the segment is somewhat titled or angled, so that one side of the arc of the segment is higher than the other, and one side of the segment may be held more alongside the trailer and in some cases hang over the side of the trailer bed, with the other side of the segment arc raised off the trailer bed.

However, such systems may not provide an ideal weight distribution for the segment on the trailer, which in turn may not provide ideal balance and stability for the trailer with the segment loaded. In addition, such a system could induce increased wear on tires on one side of the trailer.

The present invention aims to address these problems and provide improvements upon the known devices and methods.

STATEMENT OF INVENTION

Aspects and embodiments of the invention are set out in the accompanying claims.

One embodiment of an aspect of the invention can provide a transportation system for a segment of a wind turbine tower, the system comprising: a transportation platform, the transportation platform having a centreline; and a segment support mountable on the transportation platform, wherein the segment support is configured to permit tilting of a supported segment with respect to a pivot point of the support, wherein the segment support is configured to receive a segment such that the centre of gravity of the segment is offset transversely from: the support pivot point; and/or the transport platform centreline, and wherein the segment support is configured to, having received the segment, permit tilting of the segment with respect to the support pivot point to a rest position, wherein in the rest position the centre of gravity of the segment is alignable vertically with the transport platform centreline.

This system provides the advantage that when the segment is in the tilted, rest position, the weight of the segment is balanced over the centre of the transportation platform, so that the transportation arrangement may be more ideally stable. This may for example result in less wear on tires on one side of a truck being used for transportation.

In addition, since the centre of gravity of the segment can be displaced or offset from the pivot point of the support, it may be easier to load the segment, as the segment is now naturally biased to the appropriate side of the support. For example, a crane lowering the segment can now be used to control the tilting action, since the segment's own weight will (at least initially) cause the tilting or rotating action.

The segment may be a curved sheet, and the segment may be combinable with other like segments to form a completed wind turbine tower.

The centre of gravity of the segment being alignable with the centreline may entail that when the support is mounted on the transportation platform, the centre of gravity will in the rest position be aligned with the centreline. This vertical alignment may entail that the centre of gravity and the centreline of the transportation platform are in the same plane. The rest position can be a rest position on the segment support.

Optionally, the segment support comprises a segment support tool, the segment support tool is tiltable with respect to the support pivot point, the segment support tool is configured to receive the segment, and the segment support tool is configured, having received the segment, to tilt with respect to the support pivot point to permit the tilting of the segment to the rest position.

Suitably, the support pivot point is alignable with the centreline of the transportation platform. In some embodiments, the pivot or tilt point or axis need not be aligned with the centreline.

In embodiments, the segment support is configured to permit the tilting of the supported segment with respect to the support pivot point under the weight of the supported segment.

Optionally, the segment support tool is configured to permit the tilting of the supported segment under the weight of the supported segment.

Suitably, the curved sheet segment comprises a pair of opposed long edges and a pair of opposed short edges, the segment being combinable with other like segments to form a section of a wind turbine tower, wherein those sections are mountable adjacent to other like sections to form a completed wind turbine tower.

In embodiments, the transport platform comprises an elongate body, the centreline runs longitudinally along the elongate body, and the transportation system comprises a front segment support mountable at a front end of the elongate body, and a rear segment support mountable at a rear end of the elongate body.

Optionally, each of the front and rear segment supports are configured to receive the segment and to permit tilting of the segment with respect to the pivot points of the respective segment supports.

In an embodiment, each of the front and rear segment supports are configured to receive the segment such that the centre of gravity of the segment is offset transversely from: the respective support pivot point; and from the transport platform centreline.

Suitably, the pivot points of the respective front and rear supports lie on a pivot axis running longitudinally along the elongate body.

Optionally, the segment support tool comprises a pair of support arms, the support arms extending in opposite directions transversely away from a centre of the segment support tool, in order to support opposite sides of the segment.

In an embodiment, a first arm of the pair of support arms comprises a footing for supporting one edge of the segment. Alternatively, the transportation platform comprises a footing for supporting one edge of the segment.

Optionally, the footing is adjustable, and wherein adjustment of the footing is operable to shorten a transverse length of the segment support, thereby allowing adjustment of a position of a received segment on the segment support.

An advantage of the adjustable footing is that the position of the segment on the support can be adjusted, which means that the position of the centre of gravity of the segment can be adjusted. This allows for fine tuning of the equilibrium point of the rest position. The adjustable footing also allows for different sizes of segment to be used, as the size or lateral breadth of the support can be thus adjusted.

Suitably, the footing comprises a self-locking mechanism.

In embodiments, the segment support comprises one or more support pads for contacting the segment on receipt of the segment, and for supporting the segment during tilting. These may be positioned along, or on the end or ends of the support. The support pads may comprise a friction promoting surface, in order to help grip the supported segment.

Suitably, the segment support comprises a frame mountable on the transportation platform, on which frame the segment support tool is mounted at the support pivot point.

One embodiment of another aspect of the invention can provide a segment support for a transportation system according to any preceding claim.

One embodiment of another aspect of the invention can provide a method of loading for transportation of a segment of a wind turbine tower, the method comprising: suspending the segment above a transportation platform, the transportation platform having a centreline, and having mounted thereon a segment support, the segment support configured to permit tilting of a supported segment with respect to a pivot point of the support; lowering the segment onto the segment support such that the centre of gravity of the segment is offset transversely from: the support pivot point; and/or the transport platform centreline; and the segment support having received the segment, further lowering the segment until the segment tilts, with respect to the support pivot point, to a rest position, wherein in the rest position the centre of gravity of the segment is aligned vertically with the transport platform centreline.

Optionally, the segment support comprises a segment support tool, and wherein the segment support tool is tiltable with respect to the support pivot point, wherein the step of lowering comprises lowering the segment onto the segment support tool, and wherein following the segment support tool having received the segment, further lowering the segment until the segment support tool tilts with respect to the support pivot point, to permit the tilting of the segment to the rest position.

Suitably, the support pivot point is aligned with the centreline of the transportation platform.

In embodiments, the step of lowering comprises: lowering the segment onto the segment support such that the centre of gravity of the segment is offset transversely from: the support pivot point; and the transport platform centreline, so that the segment tilts under the weight of the segment with respect to the support pivot point.

Suitably, the segment support comprises a pair of support arms, the support arms extending in opposite directions transversely away from a centre of the segment support, in order to support opposite sides of the segment, and wherein a first arm of the pair of support arms comprises a footing for supporting one edge of the segment, the method comprising adjusting the footing for supporting the segment edge, to adjust the position of the segment on the segment support, said adjustment operable to move the centre of gravity of the segment transversely towards or away from the transportation platform centreline.

One embodiment of another aspect of the invention can provide a transportation system for a segment of a wind turbine tower, the system comprising: a transportation platform, the transportation platform having a centreline; and a segment support tool mounted on the transportation platform, wherein the segment support tool is tiltable with respect to a tool tilt axis, and wherein the tool tilt axis is aligned with the centreline of the transportation platform, wherein the support tool is configured to receive a segment such that the centre of gravity of the segment is offset transversely from the tool tilt axis, and wherein the support tool is configured to, having received the segment, tilt to a rest position, wherein in the rest position the centre of gravity of the segment is aligned in a vertical plane with the tool tilt axis.

BRIEF DESCRIPTION OF THE DRAWINGS

The invention will now be described by way of example with reference to the accompanying drawings, in which.

DETAILED DESCRIPTION OF EMBODIMENTS

Embodiments of the invention provide systems and methods for transporting wind turbine tower segments, which save space on the transportation platform or vehicle by tilting the segment, but nevertheless maintain safety and stability, and provide easier loading and unloading of the segments.

Embodiments of the invention are particularly directed to transporting shell segments for large diameter steel turbine towers (LDST). When transporting the shell segments for LDSTs and other such large tower segments and sections, the truck and load must fit within the confines of normal road worthiness dimensions, for example a "box" 4.8 m wide by 4.2 m tall.

For this reason, the shell segment is transported as tilted to reduce the width of road transport. In embodiments of this invention, the tower shell is loaded with a centre of gravity (CoG) offset to the tilt axis and/or the centreline of the transportation platform. This enables crane assisted tilting, rather than having to rely on powered tilting; when lowering the shell onto the support mounted on the platform, the shell starts rotating under the influence of gravity because of the offset to the rotation/pivot point. This allows for cheaper and safer tilting, as the tilting is done with crane, compared to active titling using hydraulics or mechanical devices. Moreover, once it has tilted to the final rest position, the CoG of the segment is aligned to the centre of the trailer/truck to give balanced and stable transport. This allows safer transport due to the balanced load on the trailer/truck.

In certain embodiments, the support/tool is configured such that the rotation point of the support (for tilting the loaded/support segment) intersects a vertical line (centreline) from the centre of the transportation platform or truck; this centreline is within a vertical plane proceeding along the length of the transportation platform. When the shell is being loaded it is lifted with hooks such that the lifting line intersects the CoG of the shell and the shell sides are in a horizontal orientation. The shell is loaded onto the truck with an offset between the rotation point of the tool and the CoG point of the shell. When lowering the shell further the shell starts rotating under the influence of gravity and because of the offset to the rotation point, until it rests on a support hook. When it rests on the truck the CoG of the shell now intersects the centerline of the truck and thereby provides balance.

A two-point support of the shell enables transport of various size shells on the same transport frame. This allows for cheaper road transport as the same transport equipment can be used for various size tower shells.

An adjustable side hook with self-locking enables accurate offset and safe transport. The length of the J-like side hook/support is for controlling the final resting point and thus the position of the CoG of the shell. In an embodiment the length can be adjusted to fit other shell sizes.

Figure 1:
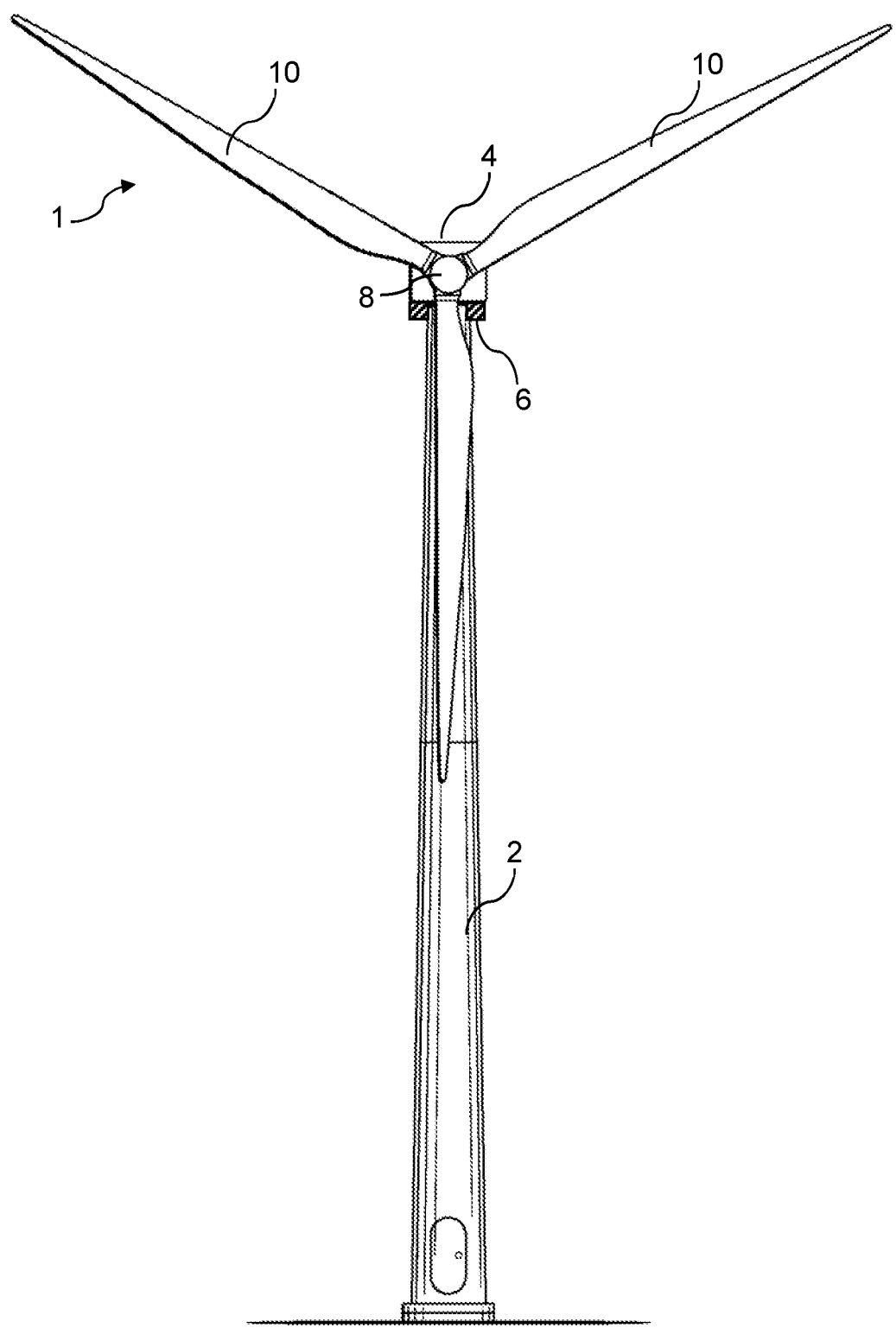
FIG. 1 is a diagram illustrating a typical wind turbine arrangement.

Referring initially to FIG. 1, a wind turbine 1 according to an embodiment of the invention comprises a tower 2, a nacelle 4 rotatably coupled to the top of the tower 2 by a yaw system 6, a rotating hub 8 mounted to the nacelle 4 and a plurality of wind turbine rotor blades 10 coupled to the hub 8.

Figure 2:
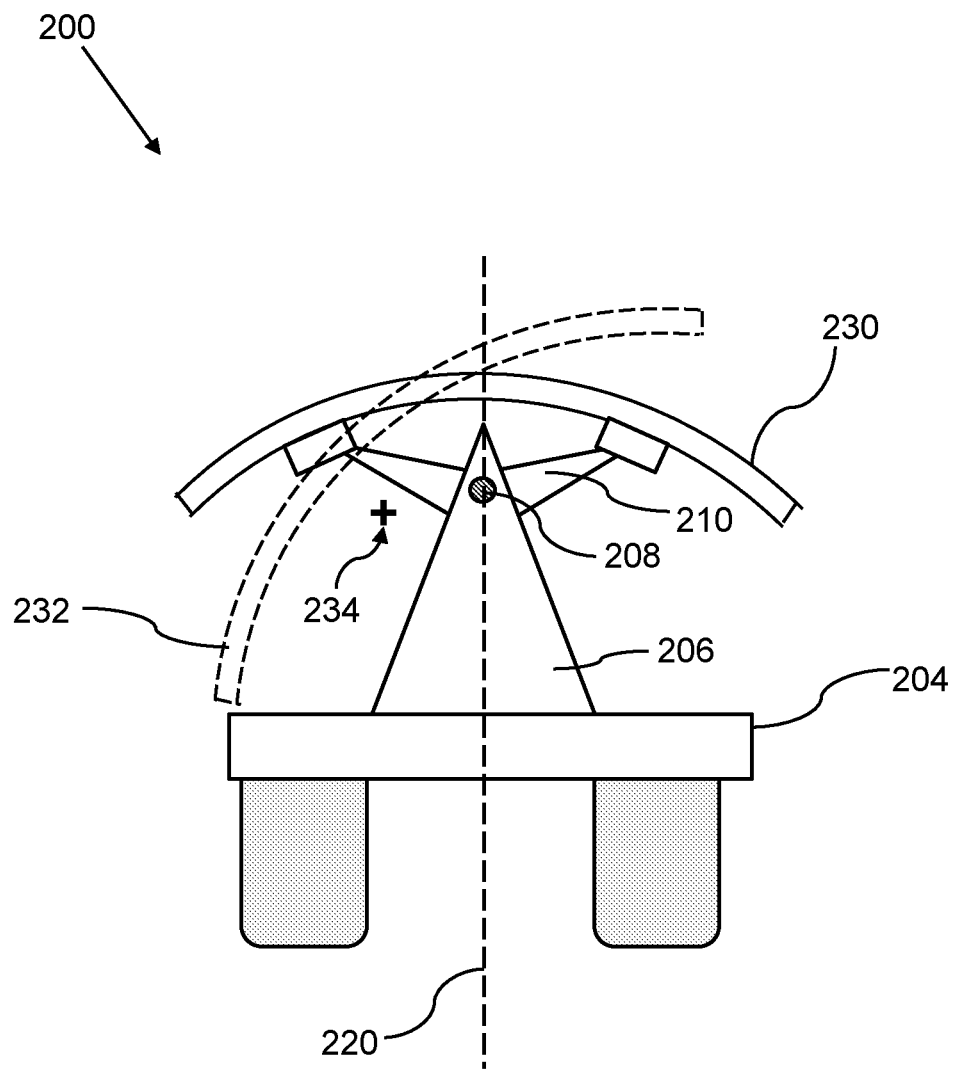
FIG. 2 is a diagram illustrating a previously considered wind turbine tower segment transportation system.

FIG. 2 is a diagram illustrating a previously considered wind turbine tower segment transportation system 200. A support tool or frame 206 is mounted on a transportation platform, in this case a truck bed 204. The support tool 206 comprises two arms 210 which project in the transverse or lateral direction (across the width of the truck) from the support tool 206, in opposite directions, providing two support points, one at the end of each arm, for the segment 230 to be supported on. The support tool has a central support stanchion from which the arms 210 project. In configurations previous to this system, segments would be transported in this way, with the segment lying horizontally across the vehicle, the arc spanning the width of the truck, with both edges of the segment at the same height and the centre of the segment over the centre of the truck, indicated by the vertical centreline 220. In this way the segment would be balanced, but for large segments the width of the arc of the segment could be too large for normal roads.

Thus in this previously considered configuration, the support is provided with a pivot 208 on which the arms 210 are mounted. This allows the pivot point to rotate, the arms to pivot around it, and the segment 230 to move or tilt around (or with respect to) the pivot point to a tilted position (dotted outline 323) which makes the loaded volume less wide than the horizontal configuration 230.

However, since initially the segment 230 was balanced on the support, with its centre over the pivot point and in line with the centre line, in the secondary tilted position, the centre of gravity (CoG) (marked here with a cross 234) of the segment will now be displaced to the left of the centreline. This means that the substantial weight of the segment may now render the vehicle not properly balanced. For example, for large turbine tower segments, the segment weight may be between 50 and 100 tonnes, and potentially more for larger towers. This could make the vehicle less than ideally stable, and could produce wear preferentially on that side of the vehicle.

In addition, during loading of the segment onto such a system, since the initial loading is to balance the segment on the support 206, it may be the case that it will be non-trivial to tilt the heavy segment (since it is balanced over the support) and its inertia may require an active or positive means of movement, such as a hydraulic or mechanical actuator to push it into the tilted position. Furthermore, if the mechanisms are sufficiently prepared or lubricated so that the segment is to be expected to drop freely into the tilted position once initiated, it may be difficult to prevent the segment from tilting in the opposite direction to that desired, since it is initially balanced.

Figure 3:
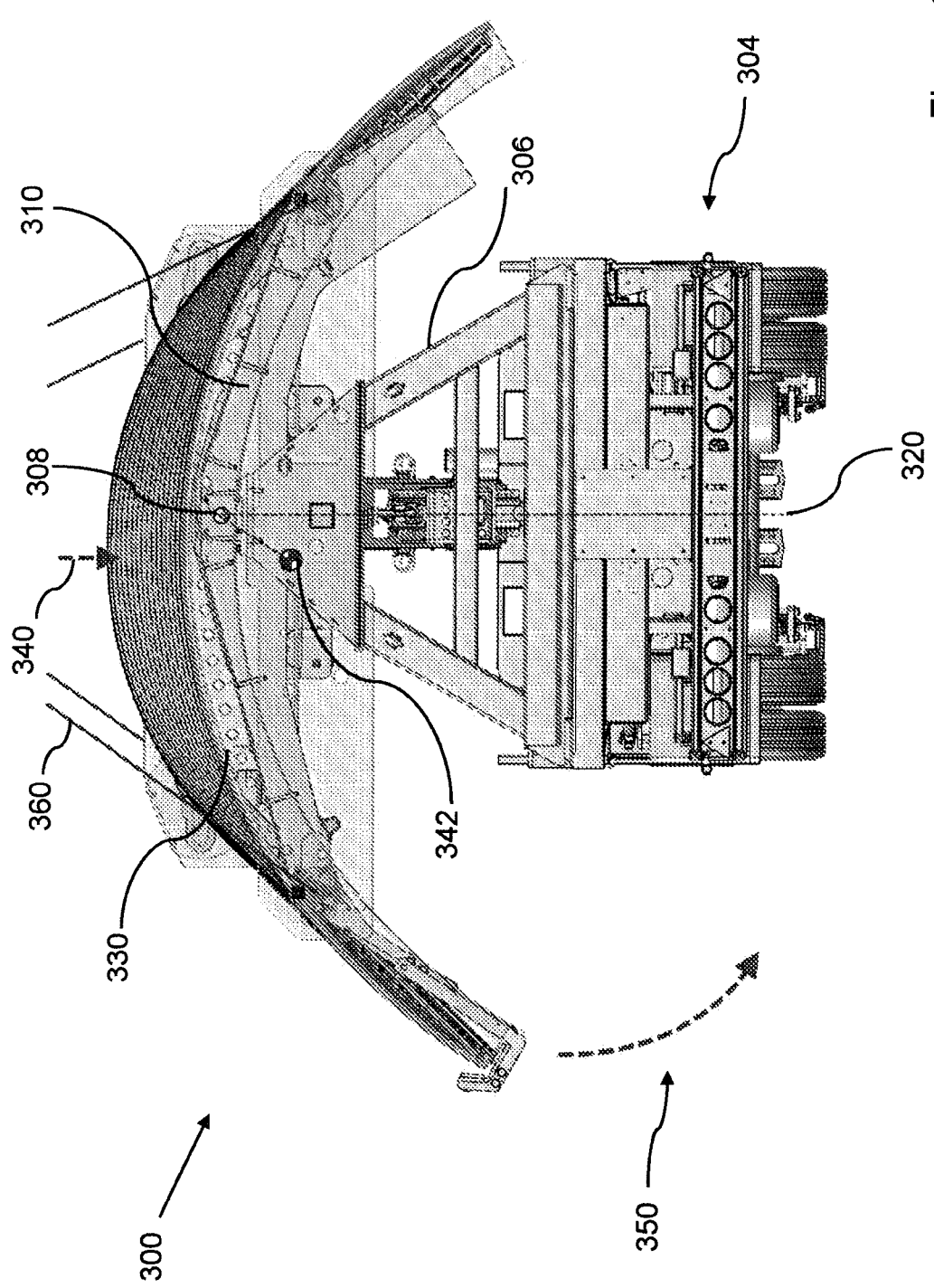
FIG. 3 is a diagram illustrating a wind turbine tower segment transportation system according to an embodiment of the invention.

FIG. 3 is a diagram illustrating a wind turbine tower segment transportation system 300 according to an embodiment of the invention. The system again comprises a transportation platform truck bed 304, with a support frame 306 mounted on it, and a support tool arm 310 mounted on the frame at a pivot point 308, which is aligned with a centreline 320 of the truck.

However, in this embodiment, the segment 330 being loaded is lowered (in the direction indicated by arrow 340) into place on the support, transversely offset from the centreline (and from the pivot point). This means that the centre of gravity 342 of the segment is also transversely or laterally displaced from the centreline. This in turn entails that the segment is not balanced on the support, and will if permitted drop down to the side, in the direction indicated by arrow 350.

Figure 4:
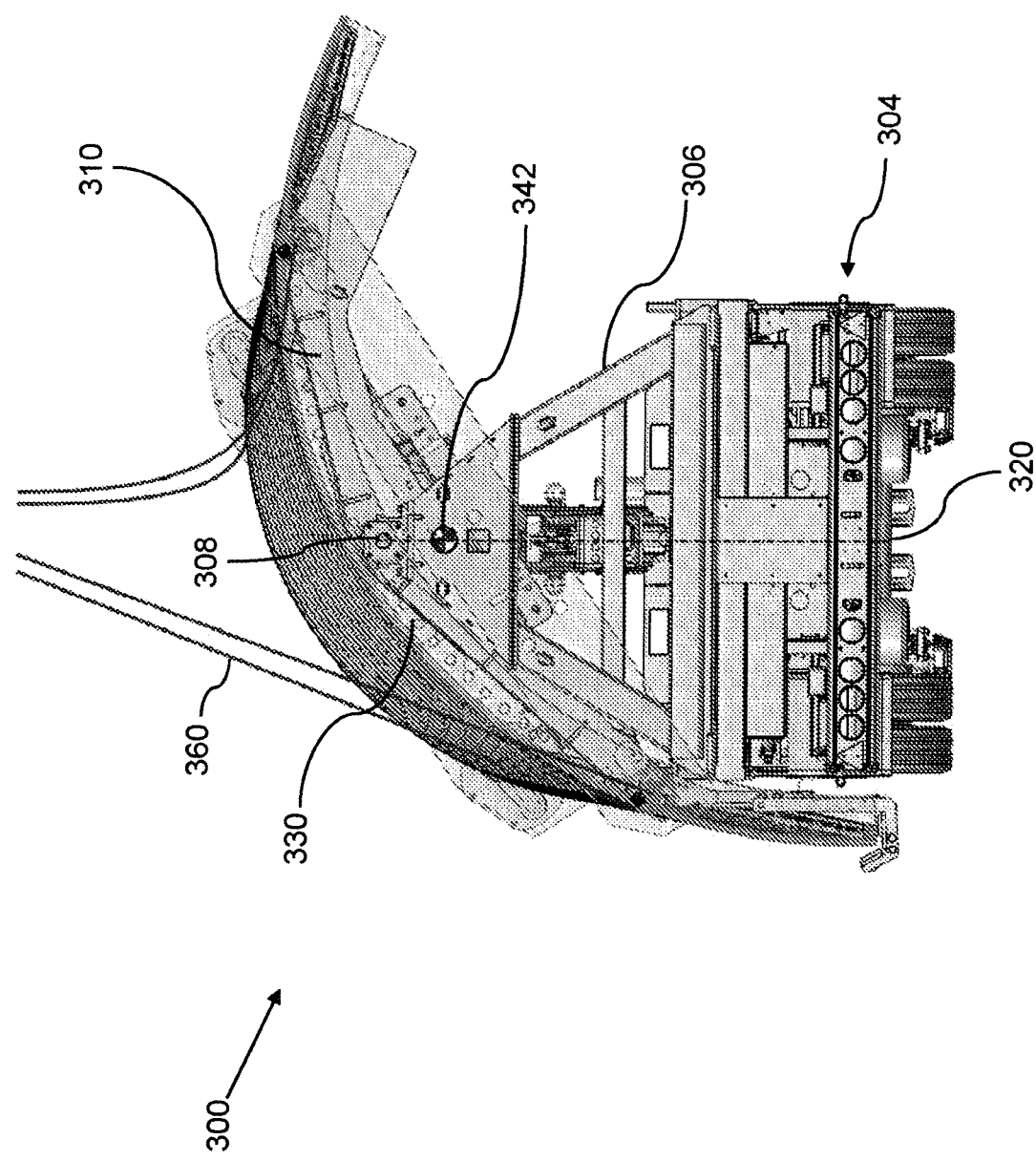
FIG. 4 is a diagram illustrating components of FIG. 3 in a second configuration.

However, in this embodiment, this unbalanced initial position is advantageous, because the segment, restrained by lines or cables 360, can simply be lowered gently from the initial position at which it makes contact with the pads on the support arm, and further lowered allowing the weight of the segment to tip or tilt it over onto its side, so that it is in a tilted position partially alongside the vehicle, as shown in FIG. 4.

FIG. 4 shows that in this tilted position, the CoG is now directly in line with the centreline 320, underneath the pivot point 308. Therefore once in this position, the weight of the segment not only balances the segment on the support, because the CoG is in line with the pivot point, but is also located centrally over the truck, because the CoG is in line with the centreline. This means that there is no further bias for the segment to move or tilt, and it is therefore essentially in a rest position; in other words, it is in equilibrium around the centreline 320, or the central plane of the vehicle 304. The lines or cables 360 can then be detached. In order to prevent slipping of the segment off the support during transit, the lower end of the support arm (the end at which the side of the segment is tilted downwards) is equipped with a stop or foot to support the edge of the segment. This feature is described in more detail with reference to FIGS. 6*a* and 6*b* below. In alternative embodiment, a stop or foot may be included on the transportation platform (such as a truck bed), in order to support the segment edge once tilted. For example, such a stop or foot may simply be a platform protruding laterally from the truck bed.

Figure 5:
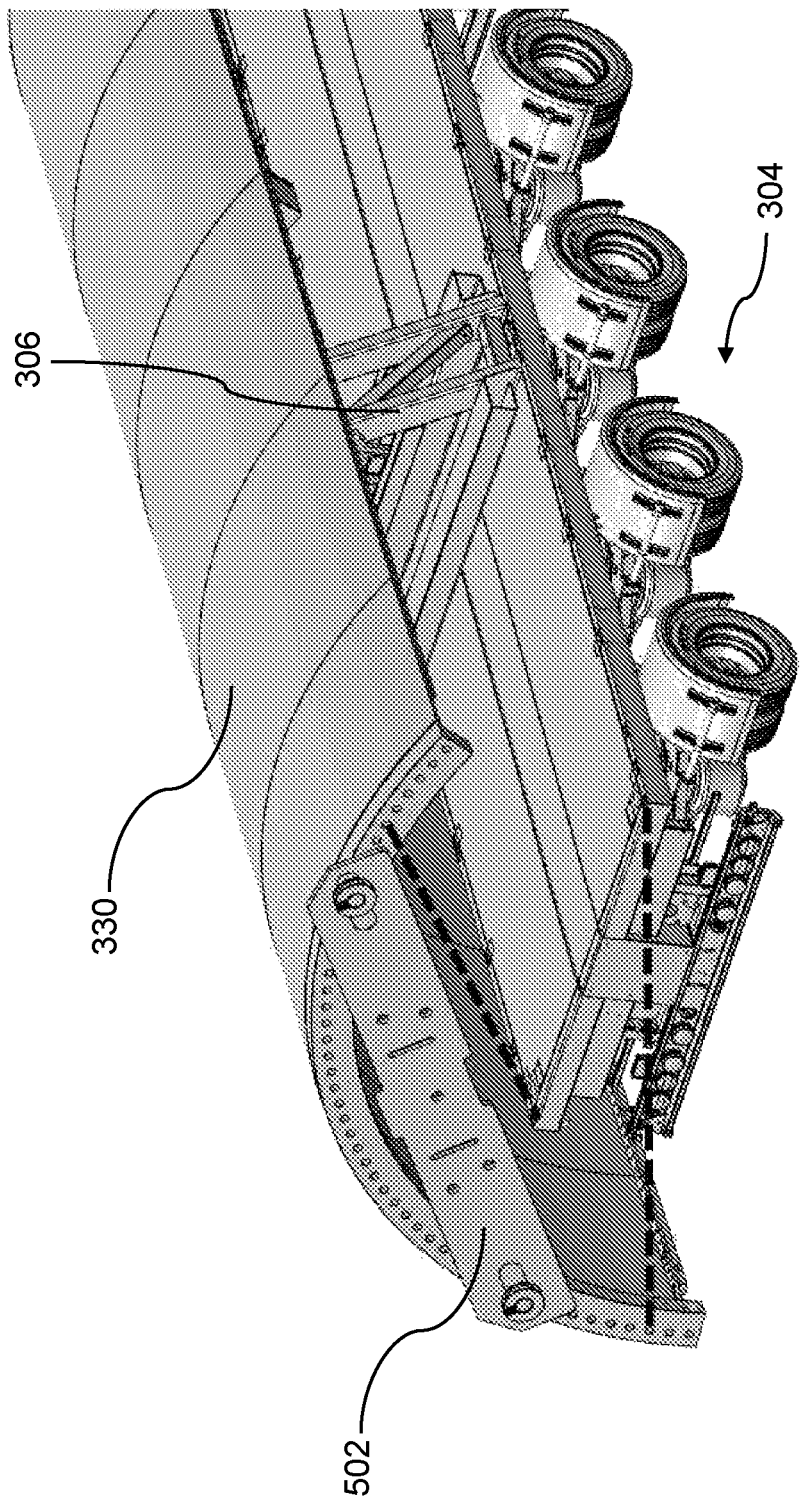
FIG. 5 is a diagram illustrating a raised side view of a wind turbine tower segment transportation system according to an embodiment of the invention.

FIG. 5 is a diagram illustrating a raised side view of this embodiment of the invention. The segment 330 is in its final tilted, rest position on the support 306, which is mounted on the truck bed 304. FIG. 5 also shows the rear distal end of the segment 330, which has a bracket 502 mounted on it—this and other brackets temporarily affixed to the segment allow the segment to be handled by securing, manipulating or lifting the brackets, so as not to handle or damage the segment itself.

As can be seen from this and other drawings, the segment is a curved sheet comprising a pair of opposed long edges and a pair of opposed short edges. The segment is combinable with other like segments to form a cylindrical section of a wind turbine tower, and in turn those sections are mountable adjacent to other like sections to form a completed wind turbine tower.

While the example described above with reference to FIGS. 3 to 5 is one embodiment of the invention, other alternative embodiments are possible which nevertheless maintain the advantages of loading the segment with a transverse offset onto the support, so that it can then be tilted into a stable rest position with the CoG aligned with the centreline of the platform or vehicle.

For instance, in one embodiment, it may be that the system is configured so that the support may not provide all the tilting which the segment may undergo. Here, when the segment is initially loaded, the support arm may not be completely level; that is, the two support pads or supporting points for the segment may not be aligned horizontally. In this case, the segment will first contact the higher of the two points on the support, and because that support point will generally not be aligned with the CoG of the segment, the segment will as before tilt around the pivot point under its own weight, in this case the initial pivot point being the contact point on the higher support pad. Once the segment has tilted sufficiently that the second contact point is made, the segment will then be fully supported by the support, and any further tilting to the rest position with then be as in the above embodiment, with the arm tilting around the pivot point of the arm on the frame support, again due to the CoG of the segment not being vertically aligned with that pivot point.

It is notable here that the use of "aligned" in this description may mean substantially aligned, or aligned within a given relevant tolerance, or a concomitant tolerance for the apparatus described, or a tolerance in relation to the offset described (such as between 0 and 25%, preferably between 0 and 10% of the initial offset). For the tilting and rotational effects described, the alignment may be within a given small or negligible angle or section of arc. Components being alignable can be taken in some embodiments to mean that in the functions described, at the later point in the process the components may be aligned.

It is also possible in an embodiment for the entire tilting action to be undertaken by action of pivoting around a contact point on the support or support arm pad in this way. For example, if the support arm is for some reason fixed or stuck due to malfunction in the rest position as shown in FIG. 4 (or even, built to have only one such position), the segment can still be gently lowered onto the support, first tilting around the first support pad, and ending in the rest position, e.g. with the lower edge supported by the footing and the CoG aligned underneath the pivot and with the centreline.

In other embodiments, it may be more practical in some circumstances for the pivot point of the support arm on the support frame not to be precisely or even closely aligned with the centreline of the platform. However, the segment will still be able to be tilted around the pivot point of the support under the weight of the segment as before, because it will be lowered onto the support with the CoG of the segment offset to the pivot point. In these embodiments, the point at which the segment comes to rest will be different, because the pivot is no longer aligned with the centreline. The segment can still be advantageously balanced over the vehicle as before, that is, the CoG can be aligned with the centreline. But in this case, the segment may not 'hang' under the pivot point if this does not share the centreline. The segment or support arm may then simply be rested on an edge of the truck bed. In addition, the loading of the segment may have to be additionally eccentric or transversely offset from the pivot or centreline in order to line the CoG up in the rest position.

In some embodiments, a brake mechanism may be added to the support, so that the tilting or rotation of the arm(s) 310 around the pivot point 308 of the support can be stopped or slowed if necessary, for example during loading. This may allow for even greater control of the loading procedure. In other embodiments, an actuator may additionally or optionally be included to actively drive the rotation or tilting via the pivot point.

In another embodiment, the segment can be loaded onto the support tool (such as that shown in FIGS. 3 to 5) before the segment and support together are then lifted or lowered and attached to the platform/vehicle. The support and segment can then be suitably chained, lashed or otherwise secured to the vehicle. It may be noted that such chains or lashings can be used for other components in embodiments, such as securing the segment to the support, or the segment to the transportation platform (in addition) once loaded.

In an alternative embodiment, the support arm or tool 310 may itself be loaded onto the frame 306 of the segment support; for example, the frame may incorporate a cradle with a bearing for receiving a rotary shaft incorporated into the arm 310. The shaft can then lowered into the cradle onto the bearing, whereupon the shaft and bearing can perform the pivot function. Similarly, the segment may be pre-attached to the support arm for loading, and the segment and arm loaded onto the support frame together.

In embodiments, the support points of the support may be pads or other suitable receiving arrangements on the end of arms of the support. These support points may somewhat grip the segment, for example with a frictional surface, such as a rubber surface. In alternatives, the segments may be directly affixed to the support points.

The pads or support points may comprise any number of such surfaces positioned along the arm or tool in order to support the segment, or even a continuous support surface on the arm. The pads or support points themselves may be rotatable, in order to comfortably accommodate curved segments having different radii.

In other embodiments, other vehicles or platforms are envisioned to be used. For example a linear carriage means such as a rail or train system may be used; it may be that lateral space is limited in such a system, thereby making advantageous use of these systems. A waterborne vessel, which may also have limits on the breadth of channel it can pass, may be used.

Generally the transportation platform will comprise some form of elongate body. In the case of a truck bed or similar, this body may for example be an extending boom trailer, where the front and rear platform (on which the front and rear supports are mounted) are separated by a long connecting limb or tether. The front and the rear tool may also not be mounted on the same trailer; for example one arrangement may have the rear support/tool riding on a dolly connected or coupled to the truck by the tower shell itself.

In other arrangements and embodiments, specific features may differ. For example, other arrangements may have additional support points or support arms. The support may be constructed in other ways to provide the same pivoting and tilting advantages. The support arm may be a frame or platform or other means of providing support during the tilting action.

Figure 6A:
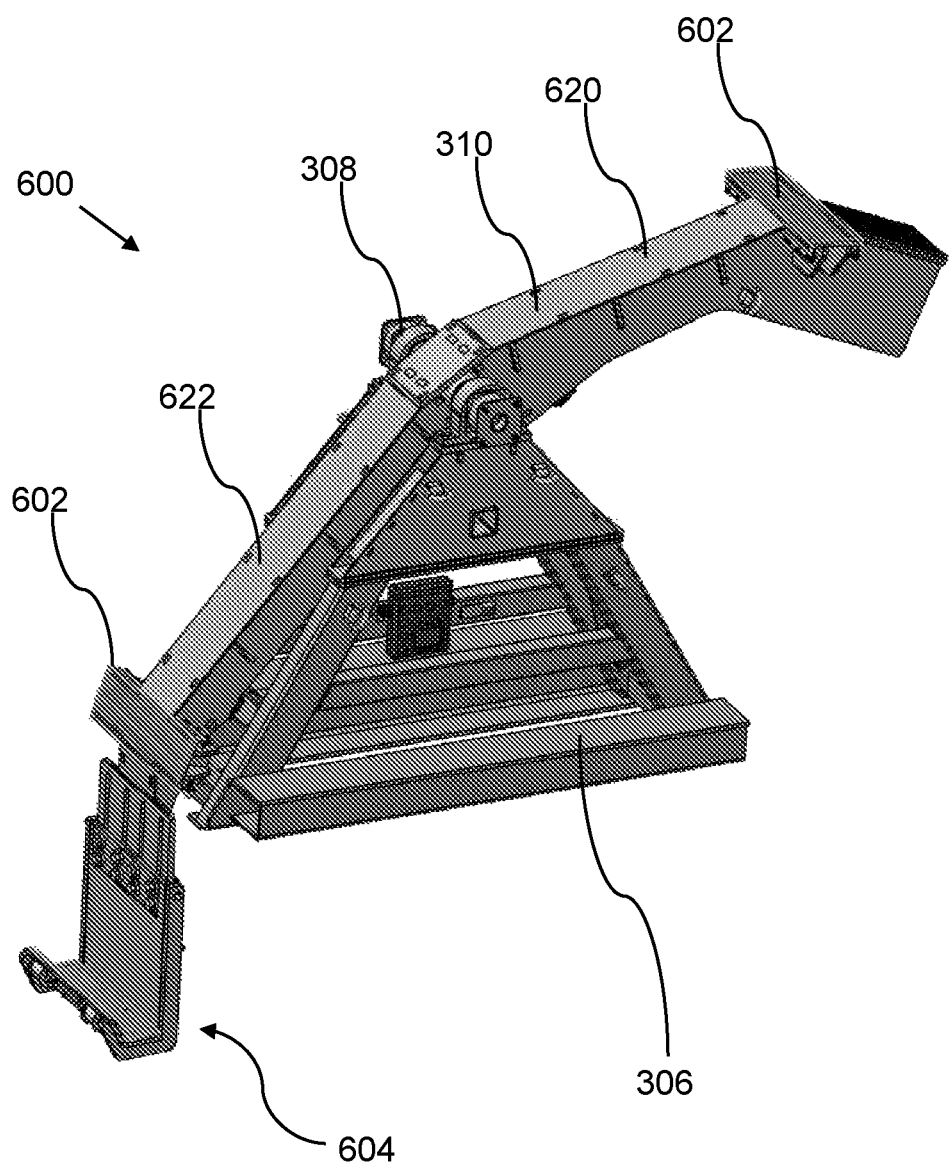
FIG. 6a is a diagram illustrating a rear support tool for a wind turbine tower segment transportation system according to an embodiment of the invention.

Referring now to FIG. 6a, this is a diagram illustrating a rear support tool 600 for a wind turbine tower segment transportation system according to an embodiment of the invention. As illustrated previously, the support comprises an arm 310, a pivot point 308, and a support frame 306 on which the arm is mounted. The arm 310 can be considered to comprise two (sub-)arms 620 and 622, each projecting laterally away from the central support 306 and the pivot point 308. The support pads 602 can be clearly seen in this view, without the segment. In addition, the support tool footing 604 can be seen.

Figure 6B:
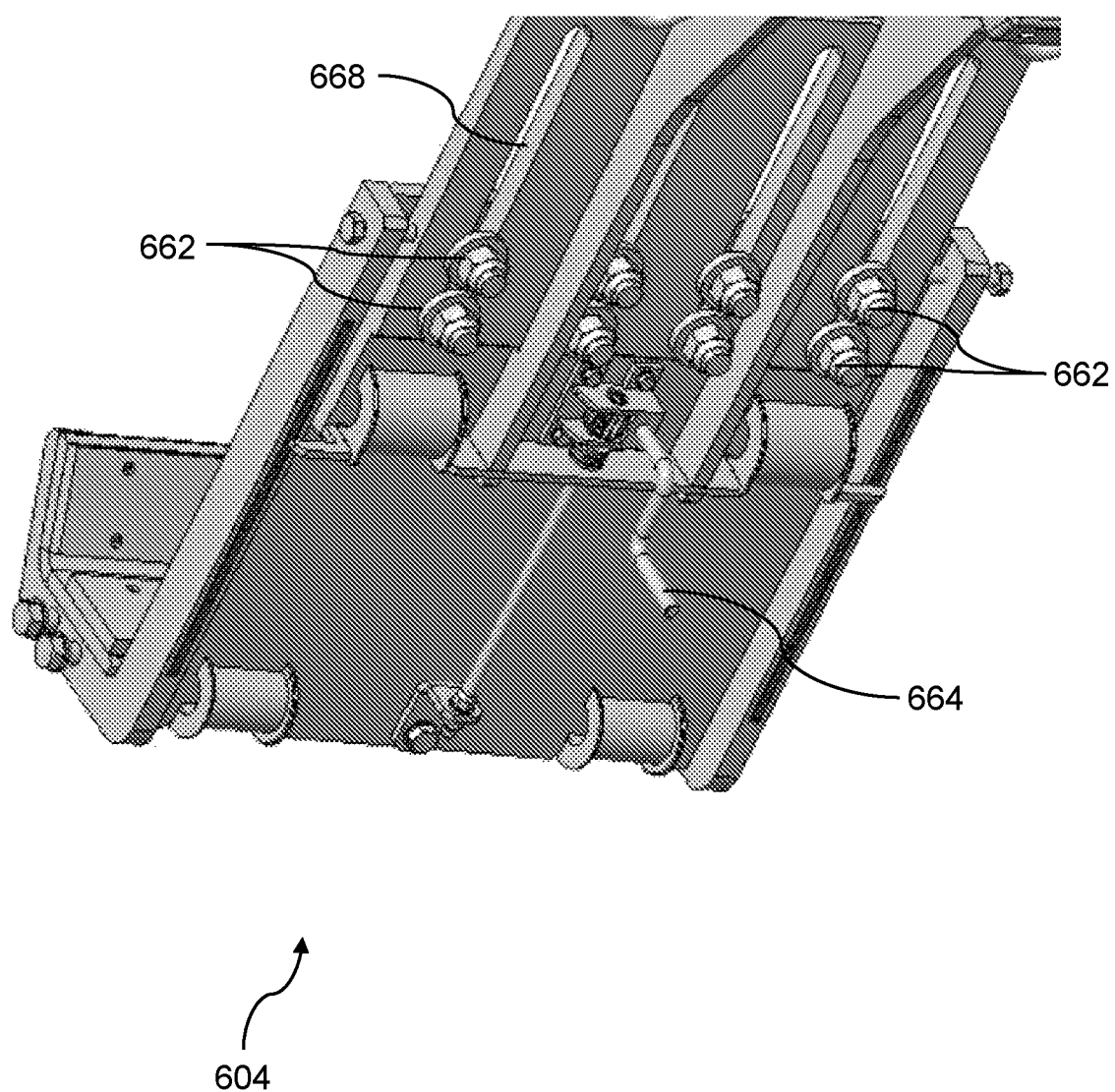
FIG. 6b is a diagram illustrating a footing for the support tool of FIG. 6a, according to an embodiment of the invention.

FIG. 6b is a diagram illustrating this footing or hook for the support tool of FIG. 6a, according to an embodiment of the invention. This footing 604 is movable up and down on the support arm, via the slots 668 in the arm and the cooperating bolts or slide fasteners 662 on the footing. This means that the footing is movable to shorten or lengthen the width available for the segment received by the support. This has two main functions, (a) to allow the support arm to be used for different sizes of segment, and (b) to allow the adjustment of the positioning of the segment on the support.

As can be seen from FIG. 4, the segment in its resting position is hanging on the support in a rested position, because the CoG is underneath and aligned with the pivot point and the centreline. The footing or hook 604 helps to secure the segment and stop the segment sliding around or off the tool during transit. However, it may be the case that a particular segment has been loaded so that the expected offset for that segment (to arrive at the rested configuration seen in FIG. 4) was not achieved, and so the rested position is incorrect; either the CoG is not properly aligned, or it is aligned with the segment not being sufficiently lowered down to the side of the vehicle. Thus the footing can be used to adjust the position of the segment on the support, which hence adjusts the offset of the CoG of the segment and therefore adjusts these aspects of the resting position.

To adjust the side footing/hook, the relevant size or scale for the given segment is located or looked up, and the slide fasteners 662 are loosened. The footing is adjusted using crank handle 664 to raise and lower the footing, the fasteners moving along the slide slots 668. The slider fasteners are then tightened back up, and the crank handle stored.

Figure 6C:
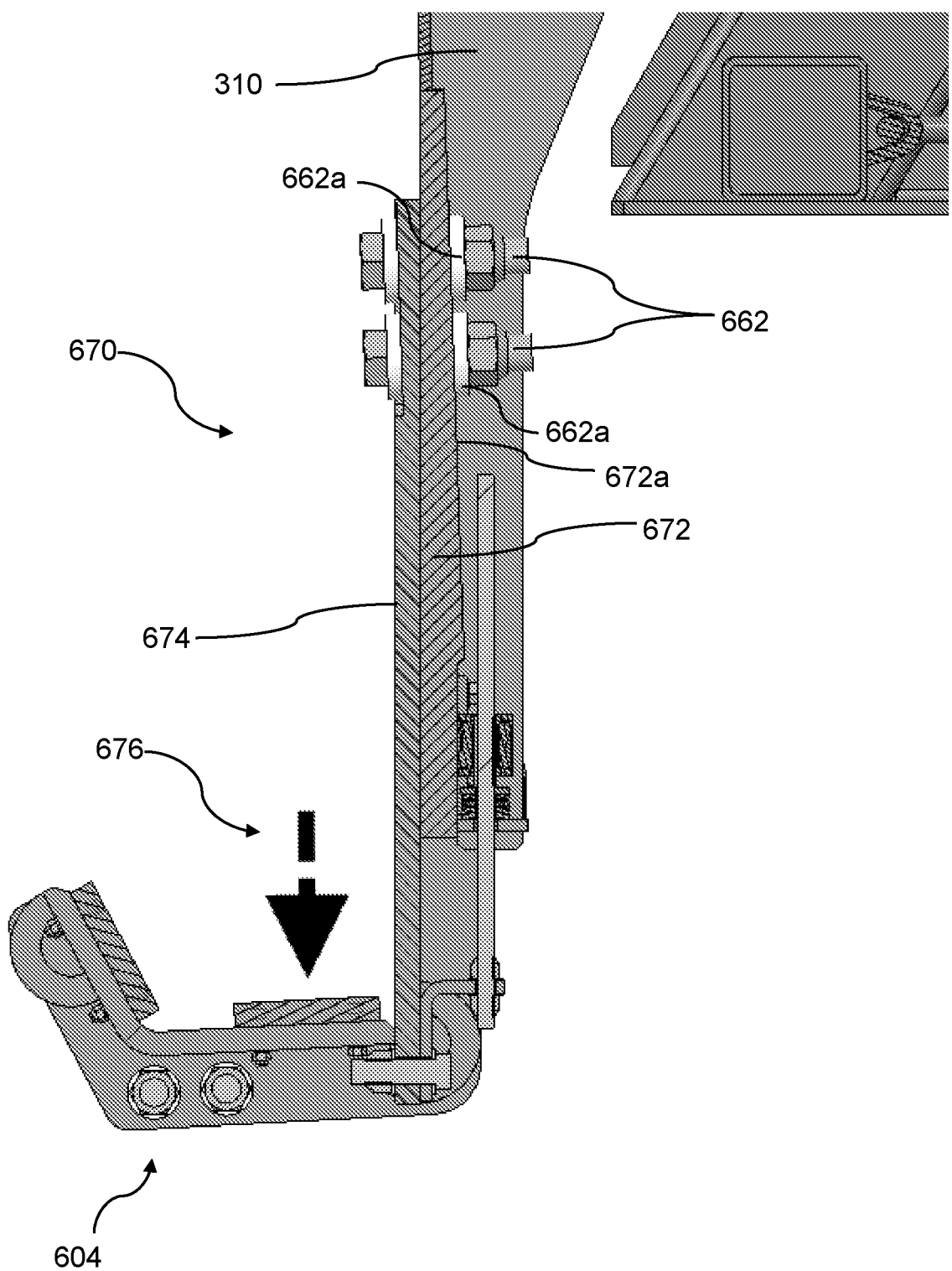
FIG. 6c is a diagram illustrating a self-locking mechanism for the footing of FIG. 6b.

FIG. 6c is a diagram illustrating a self-locking (or tightening or securing) mechanism 670 for the footing 604 of FIG. 6b, as a section through the footing 604. The slide fasteners or bolts 662 are mounted on the footing, and can slide up and down in the slots 668 (FIG. 6b) in the support arm 310.

The locking mechanism is comprised of two inclined planes 672 (mounted on the arm 310) and 674 (mounted between the arm and the footing), which are designed primarily to operate once the slide bolts 662 have been tightened, and to further secure these bolts. These two inclined planes are located in such a way that a force application on the footing or hook (indicated by arrow 676), for example due to the weight of the segment on the footing, will cause the planes to slide with respect to each other. Since the bolts 662 are attached to the outer plane 674, they are able to slide relative to the inner plane 672 along the slots 668. By virtue of this sliding action, the heads 662a (or washers/shim if provided) of the bolts 662 ride up the inclined inward facing surface 672a of the inner plane 672 thereby stretching the bolts, which in turn stops the sliding motion by increasing the lateral force applied by the bolts on the two planes 672, 674. This allows the operator of the system, for example a truck driver, to tighten the bolts with simple hand tools, since the final locking or securing step is undertaken automatically by this locking/tightening system.

Figure 7:
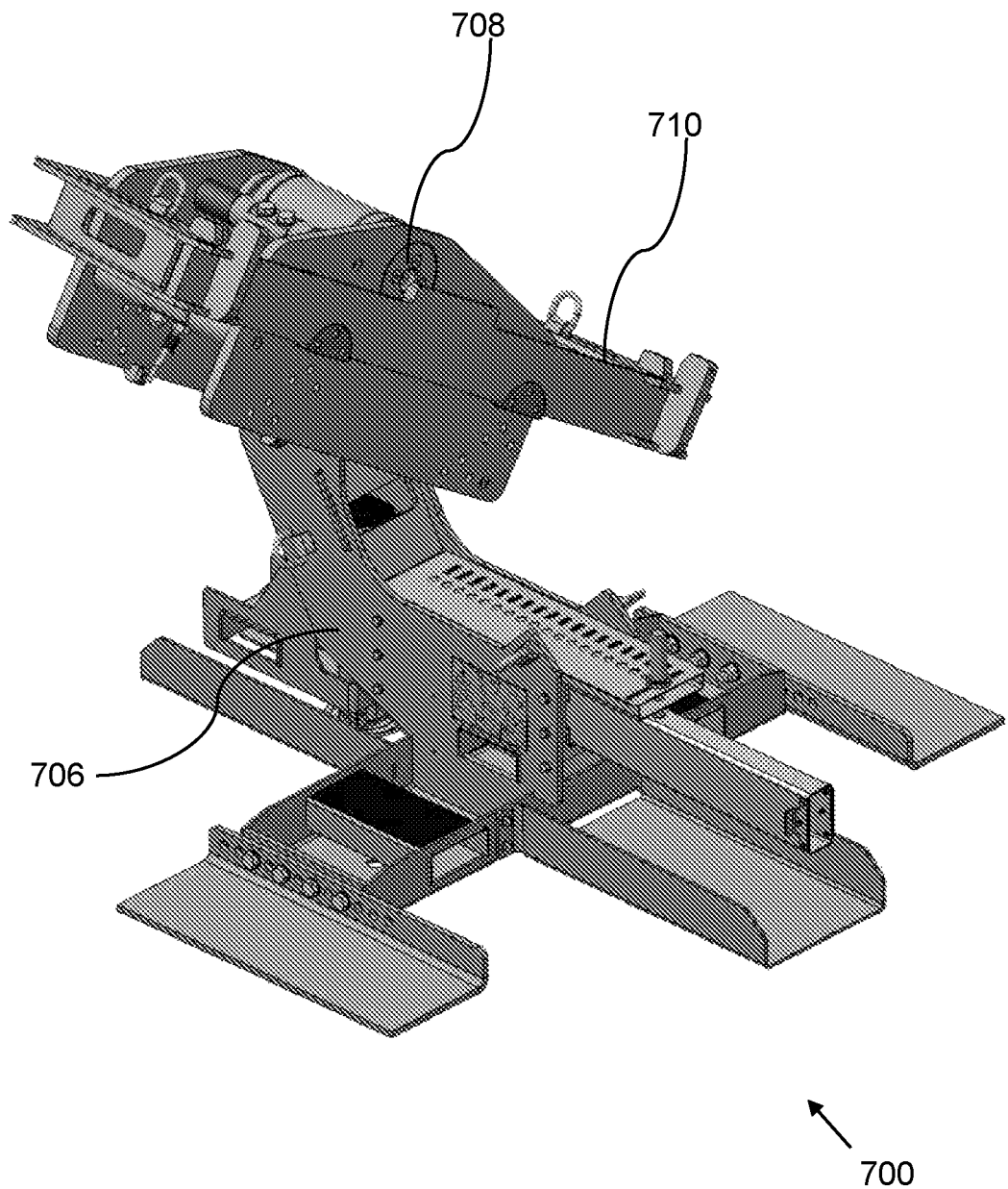
FIG. 7 is a diagram illustrating a front support tool for a wind turbine tower segment transportation system according to an embodiment of the invention.
Figure 8:
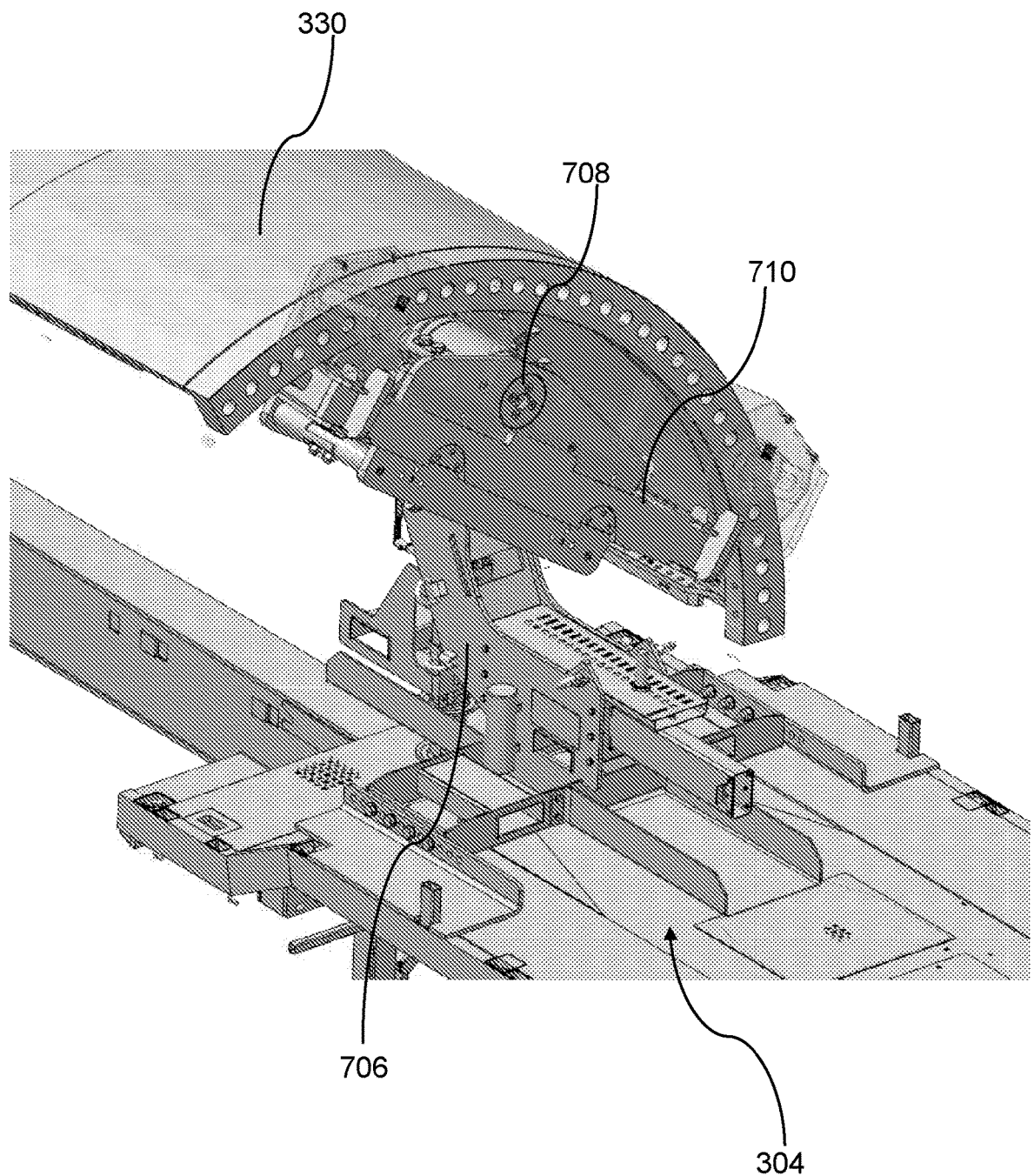
FIG. 8 is a diagram illustrating the front support tool of FIG. 7 installed on the transportation platform, according to an embodiment of the invention.

FIG. 7 is a diagram illustrating a front support tool 700 for a wind turbine tower segment transportation system according to an embodiment of the invention, and FIG. 8 is a diagram illustrating the front support tool of FIG. 7 installed on the transportation platform, with the segment loaded, according to an embodiment of the invention.

As can be seen, this component has similar features to the rear support tool. The support has a frame 706 on which is mounted a tiltable arm or platform 710, which is pivotable around the pivot point 708. Thus in similar fashion to the rear support, the segment 330 can be placed on the arm or platform with an offset of the CoG to the pivot point and to the centreline, and then, in cooperation with the same movement of the rear support as the segment tilts, the front support also tilts until the segment is in the rest position with the CoG of the segment underneath and aligned also with the pivot point 708 of the front support and the centreline. The centreline of the vehicle 304 effectively projects a vertical centre plane along the length of the platform or vehicle, the two pivot points 708 and 308 are on a pivot axis, and the CoG of the segment is a line along the length of the segment, for example between the CoG point 342 shown in FIGS. 3 and 4 and the corresponding point on the segment with reference to the front support tool.

Figure 9:
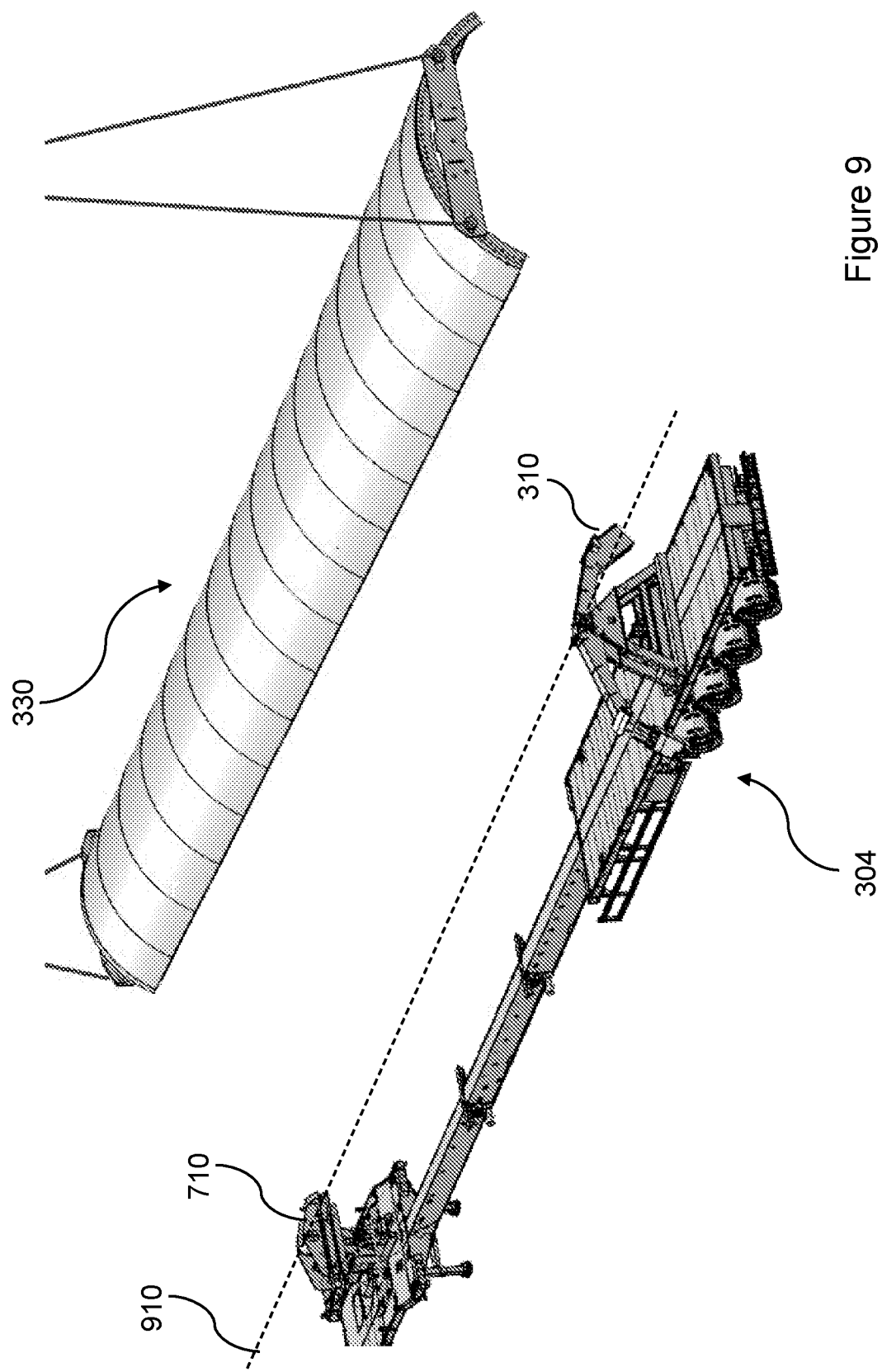
FIG. 9 is a diagram illustrating loading of a wind turbine tower segment transportation system according to an embodiment of the invention.
Figure 10:
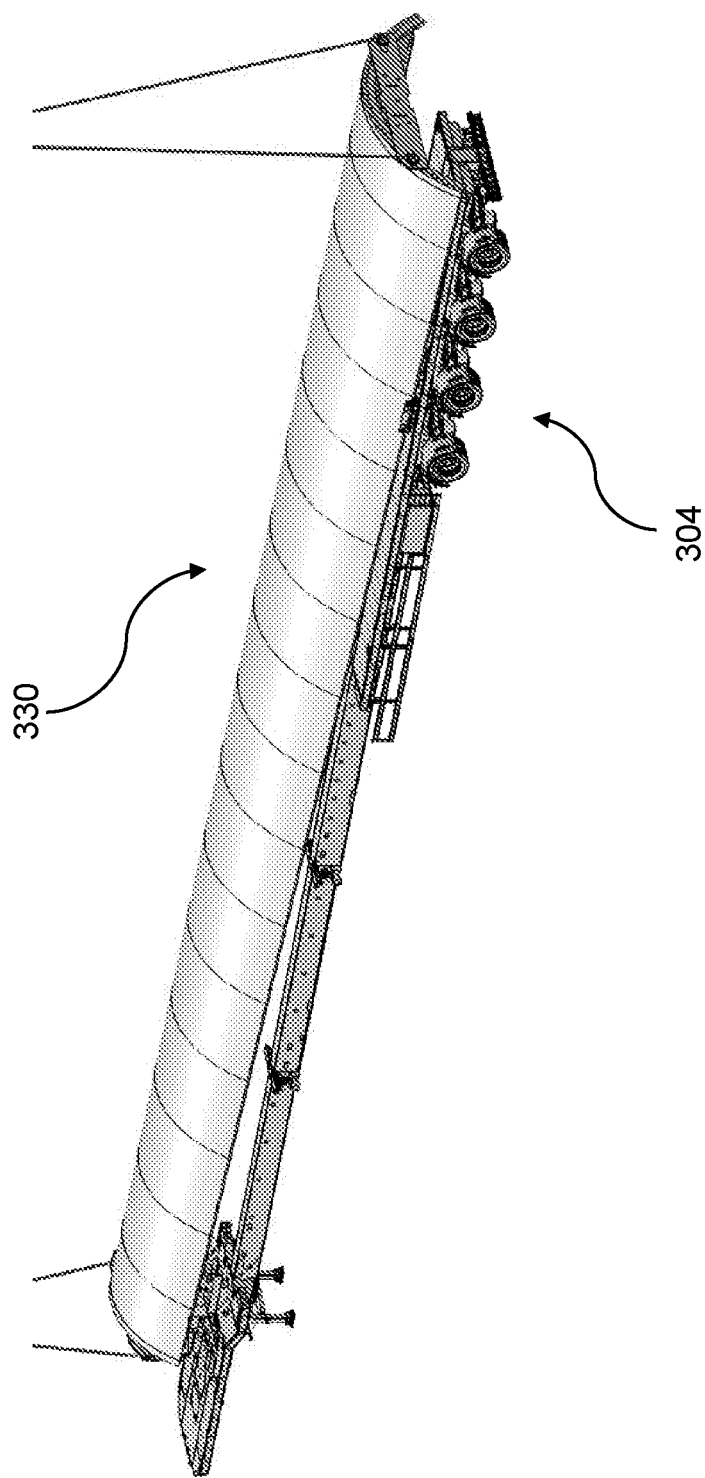
FIG. 10 is a diagram illustrating a loaded wind turbine tower segment transportation system according to an embodiment of the invention.
Figure 11:
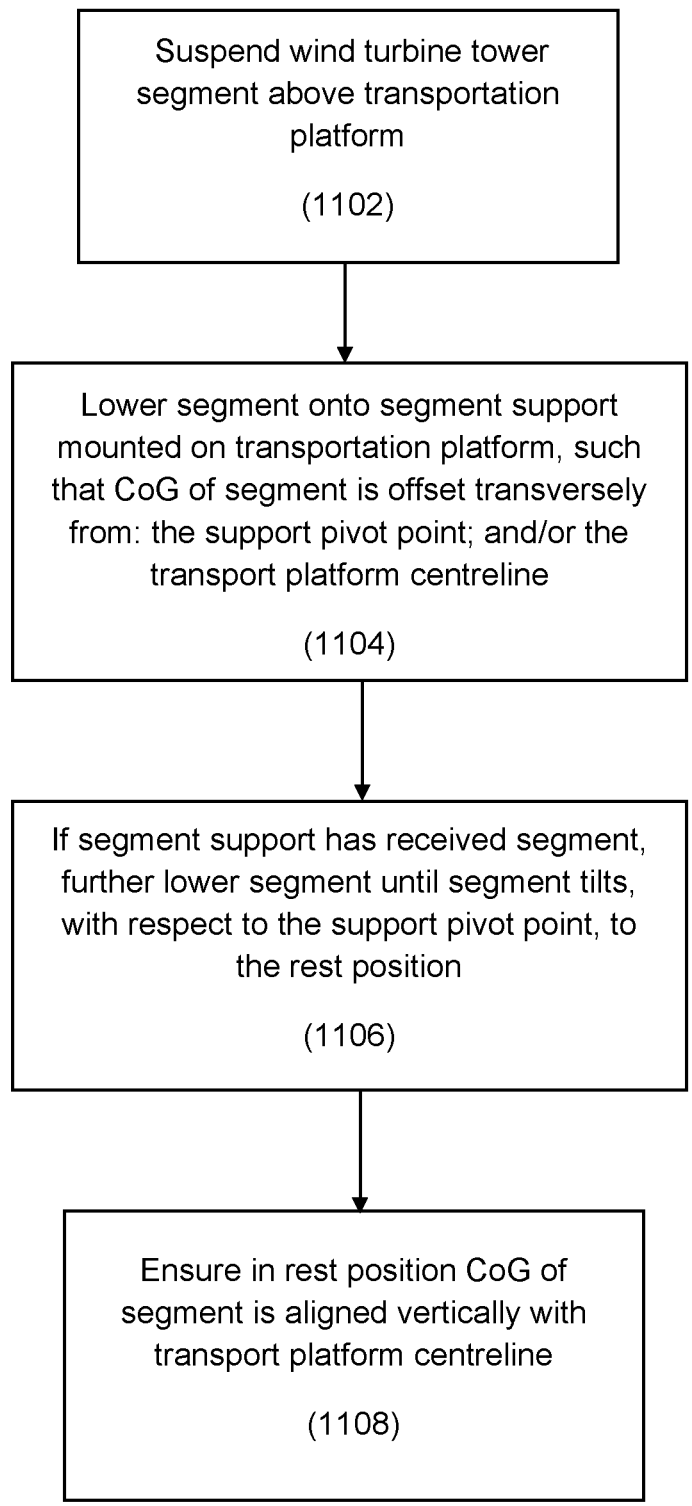
FIG. 11 is a diagram illustrating steps of a method according to an embodiment of the invention.

FIGS. 9 and 10 illustrate stages in a loading procedure according to an embodiment of the invention, and FIG. 11 illustrates steps of a method according to such an embodiment of the invention.

The segment 330 is first suspended 1102 above the transportation platform 304, the platform having mounted on it the front 710 and rear 310 supports, as shown in FIG. 9. The segment is then lowered onto the segment supports 1104 such that the CoG of the segment (with respect to each segment support) is offset transversely from: the (respective) support pivot point; and/or the transport platform centreline, as described in embodiments above. FIG. 9 also illustrates the pivot axis, or pivot point axis, that is an axis through the pivot points 308 and 708 of the respective segment support tools.

If the segment support has received the segment, as shown in FIG. 10, the segment is further lowered until the segment tilts 1106 with respect to the support pivot point, to the rest position (as illustrated in FIG. 5). It can then be ensured 1108 that in the rest position the CoG of the segment is aligned vertically with the transport platform centreline.

It will be appreciated by those skilled in the art that the invention has been described by way of example only, and that a variety of alternative approaches may be adopted without departing from the scope of the invention, as defined by the appended claims.

The invention claimed is:

1. A transportation system for a segment of a wind turbine tower, wherein the segment is a curved sheet defining a line of symmetry through a centre of gravity of the segment, and wherein the segment is combinable with other like segments to form a completed wind turbine tower, the system comprising:
   a transportation platform, the transportation platform having a centreline; and
   a segment support configured to receive the segment and permit tilting of the segment with respect to a pivot point of the segment support, the segment support comprising:
      a support frame mounted on the transportation platform; and
      a segment support tool rotatably mounted to the support frame at the pivot point, wherein the segment support tool includes a first support pad configured to engage the supported segment on a first side of the pivot point and a second support pad configured to engage the supported segment on a second side of the pivot point opposite to the first side, and wherein a first transverse distance from the pivot point to the first support pad is different than a second transverse distance from the pivot point to the second support pad,
   wherein the segment support is configured to receive the segment in a first position where the line of symmetry of the segment is vertically oriented such that the centre of gravity of the segment is offset transversely from the support pivot point, and
   wherein the segment support is configured to, having received the segment with the centre of gravity transversely offset from the support pivot point, permit tilting of the segment with respect to the support pivot point to a rest position where the centre of gravity of the segment is vertically aligned with the support pivot point.

2. The transportation system according to claim 1, wherein the support pivot point is alignable with the centreline of the transportation platform.

3. The transportation system according to claim 1, wherein the segment support is configured to permit the tilting of the supported segment with respect to the support pivot point under the weight of the supported segment.

4. The transportation system according to claim 1, wherein the curved sheet segment comprises a pair of opposed long edges and a pair of opposed short edges,
   the segment being combinable with other like segments to form a section of a wind turbine tower, wherein those sections are mountable adjacent to other like sections to form a completed wind turbine tower.

5. The transportation system according to claim 1, wherein the transport platform comprises an elongate body, and wherein the transportation system comprises:
   a front segment support mountable at a front end of the elongate body, and
   a rear segment support mountable at a rear end of the elongate body.

6. The transportation system according to claim 5, wherein each of the front and rear segment supports are configured to receive the segment and to permit tilting of the segment with respect to the pivot points of the respective segment supports.

7. The transportation system according to claim 6, wherein each of the front and rear segment supports are configured to receive the segment such that the centre of gravity of the segment is offset transversely from the respective support pivot point.

8. The transportation system according to claim 5, wherein the pivot points of the respective front and rear supports lie on a pivot axis running longitudinally along the elongate body.

9. The transportation system according to claim 1, wherein the segment support tool comprises a pair of support arms, the support arms extending in opposite directions transversely away from a centre of the segment support tool in order to support opposite sides of the segment.

10. The transportation system according to claim 9, wherein a first arm of the pair of support arms comprises a footing for supporting one edge of the segment.

11. The transportation system according to claim 10, wherein the footing is adjustable, and wherein adjustment of the footing is operable to shorten a transverse length of the segment support, thereby allowing adjustment of a position of a received segment on the segment support.

12. The transportation system according to claim 10, wherein the footing comprises a self-locking mechanism.

13. The segment support for a transportation system according to claim 1.

14. A method of loading for transportation of a segment of a wind turbine tower, wherein the segment is a curved sheet, the segment being combinable with other like segments to form a completed wind turbine tower, the method comprising:
   suspending the segment above a transportation platform, the transportation platform having a centreline, and having mounted thereon a segment support, the segment support configured to permit tilting of a supported segment with respect to a pivot point of the support;
   lowering the segment onto the segment support such that the centre of gravity of the segment is offset transversely from the support pivot point; and
   the segment support having received the segment, further lowering the segment until the segment tilts, with respect to the support pivot point, to a rest position, wherein in the rest position the centre of gravity of the segment is aligned vertically with the support pivot point.

15. The method according to claim 14, wherein the segment support comprises a support frame and a segment support tool mounted to the support frame at the pivot point, and wherein the segment support tool is tiltable with respect to the support pivot point, wherein the step of lowering comprises lowering the segment onto the segment support tool, and wherein following the segment support tool having received the segment, further lowering the segment until the segment support tool tilts with respect to the support pivot point to permit the tilting of the segment to the rest position.

16. The method according to claim 14, wherein the support pivot point is aligned with the centreline of the transportation platform.

17. The method according to claim 14, wherein the step of lowering comprises:

lowering the segment onto the segment support such that the centre of gravity of the segment is offset transversely from the support pivot point so that the segment tilts under the weight of the segment with respect to the support pivot point.

18. The method according to claim 14, wherein the segment support comprises a pair of support arms, the support arms extending in opposite directions transversely away from a centre of the segment support, in order to support opposite sides of the segment, and wherein a first arm of the pair of support arms comprises a footing for supporting one edge of the segment, the method comprising adjusting the footing for supporting the segment edge, to adjust the position of the segment on the segment support, said adjustment operable to move the centre of gravity of the segment transversely towards or away from the transportation platform centreline.

19. A transport arrangement, comprising:

a segment of a wind turbine tower including a curved sheet having a pair of opposed long edges and a pair of opposed short edges, wherein the segment is configured to be combinable with other like segments to form a section of a wind turbine tower, and wherein the section is mountable adjacent to other like sections to form a completed wind turbine tower; and a transport system configured to be coupled to the segment of the wind turbine tower, the transport system comprising:

a transportation platform having a centerline; and a segment support defining a pivot point mounted on the transportation platform and configured to engage the segment, wherein the segment support is configured to permit tilting of the segment with respect to the pivot point, wherein the segment support is configured to receive the segment such that the centre of gravity of the segment is offset transversely from the support pivot point, and wherein the segment support is configured to, having received the segment, permit tilting of the segment with respect to the support pivot point to a rest position, where in the rest position the centre of gravity of the segment is vertically aligned with the pivot point.

20. The transportation arrangement according to claim 19, wherein the support pivot point is vertically aligned with the centreline of the transportation platform.

\* \* \* \* \*